United States Patent Office 3,585,207
Patented June 15, 1971

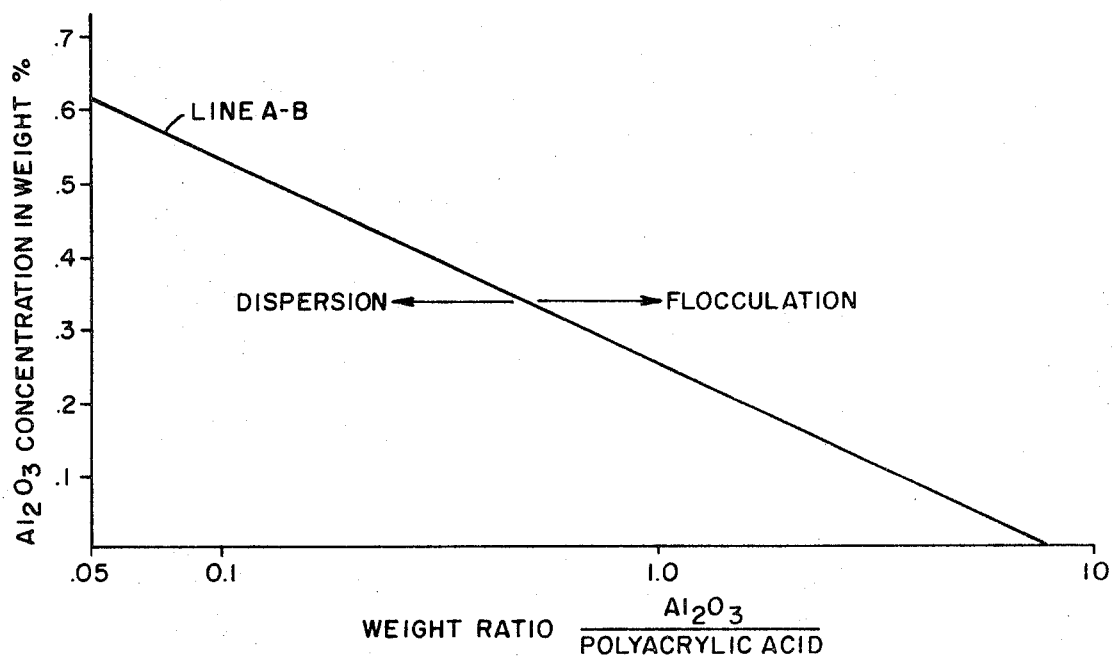

3,585,207
WELL DISPERSED WATER VEHICLE COATING SUSPENSION AND METHOD FOR PREPARING SAME
Robert W. Repsher, Kinnelon, N.J., assignor to Westinghouse Electric Corporation, Pittsburgh, Pa.
Filed Dec. 5, 1968, Ser. No. 781,515
Int. Cl. F21k 2/00; C09k 1/00
U.S. Cl. 252—301.3R                12 Claims

ABSTRACT OF THE DISCLOSURE

A well dispersed water vehicle coating suspension and method of preparing same for applying a highly adherent luminescent coating onto a substrate. The suspension comprises finely divided adherence promoting particles and finely divided luminescent material uniformly dispersed in a water lacquer system. An aqueous solution is prepared in which determined amounts of aluminum oxide adherence promoting particles are uniformly dispersed. A water soluble polyacrylic acid binder is then mixed into this aqueous solution. The amount of water soluble binder added is controlled with respect to the amount of adherence promoting particles to insure that the particles remain dispersed and do not flocculate. The coating suspension is then applied to a substrate, typically the interior of a fluorescent lamp envelope by a conventional method.

BACKGROUND OF THE INVENTION

The use of very small particle size, adherence-promoting materials in organic-binder-containing coating systems with luminescent materials in the coating processes for fluorescent lamps is well known. These adherence promoting materials permit the formation of a phosphor coating which is very stable, which means that the phosphor coating resists chipping or flaking upon impact. Finely divided aluminum oxide particles of less than 0.05 micron diameter are known to be excellent phosphor-adherence-promoting materials when used in organic coating systems. The use of water lacquer coating suspensions using water soluble polymers offers practical manufacturing advantages over the use of organic vehicle coating systems. The use of finely divided adherence promoting particles in aqueous coating solutions has not previously been effective because of the tendency of the adherence promoting particles to flocculate when water soluble polymers are necessarily added to the aqueous solution. When the aluminum oxide flocculates, the luminescent material in turn agglomerates thus preventing the formation of a uniform coating on the substrate.

SUMMARY OF THE INVENTION

It is an object of the invention to provide a homogeneous water vehicle coating suspension and method of preparation of same for applying a highly adherent, uniform, luminescent coating onto a radiation transmissive substrate, which coating suspension includes finely divided aluminum oxide adherence promoting particles and a water soluble binder.

It is a further object to provide a method of applying a highly adherent uniform coating of finely divided luminescent material and finely divided adherence promoting aluminum oxide particles to a radiation transmissive substrate.

It is a further object to provide a water vehicle coating suspension and method of preparation thereof for applying a highly adherent uniform coating of calcium halophosphate phosphor and finely divided aluminum oxide particles to a tubular fluorescent lamp envelope.

The aforementioned objects and others which will become apparent as the description proceeds are achieved by preparing a water vehicle coating suspension comprising, finely divided luminescent material, finely divided aluminum oxide, polyacrylic acid, and deionized water vehicle. The relative proportions of the aluminum oxide and polyacrylic acid are determined so that the aluminum oxide remains uniformly dispersed through the suspension and does not flocculate. These relative proportions are such that a plot of the weight percent of the aluminum oxide taken with respect to the weight of the water vehicle, expressed on a linear scale, against the weight ratio of aluminum oxide to polyacrylic acid, as expressed on a logarithmic scale, is to the left of the line A–B as shown in the figure. Furthermore, it has been determined that in preparing the preferred coating suspension in order to assure dispersion of the constituents, that the relationship of constituents will always fall to the left of the curve A–B on the figure, that at least a substantial portion of the aluminum oxide is added to the water vehicle of the suspension prior to addition of the polyacrylic acid.

DESCRIPTION OF THE DRAWING

The sole figure is a graph showing the empirical relationship which has been observed to govern the conditions under which aluminum oxide remains dispersed in a water vehicle coating suspension upon addition of a water soluble organic binder, here polyacrylic acid. The vertical axis indicates the weight percent of aluminum oxide taken with respect to the weight of the water vehicle, expressed on a linear scale. The horizontal axis expresses on a logarithmic scale the weight ratio of aluminum oxide to polyacrylic acid. The line A–B on the figure defines the condition separating dispersion of the aluminum oxide, so that any condition which can be plotted to the left and under line A–B indicates a well dispersed suspension.

DESCRIPTION OF THE PREFERRED EMBODIMENT

An aqueous solution is prepared by thoroughly mixing with about 180 gallons of deionized water, 900 grams of finely divided aluminum oxide which is commercially available under the trademark Alon-C. It is also preferable for coating purposes to add the following additive materials, 600 grams of alkylphenoxy ethanol wetting agent commercially available under the trademark Igepal CO-610 from General Aniline & Film Corp., 600 grams of sulfated natural oils blended with paraffin oils defoaming agent available under the trademark Nopco 1497V, 248 gallons of 28% ammonium hydroxide solution, and 5,000 grams of triethanolamine. The resulting aqueous solution is thoroughly stirred to uniformly disperse the aluminum oxide.

A solution of polyacrylic acid, which is available under the trademark Acrysol A–5, is then admixed with the aluminum oxide containing aqueous solution. The Acrysol A–5 is added in an amount of about 45 kilograms which includes about 11.25 kilograms by weight polyacrylic acid is thoroughly stirred into the aqueous solution, about 450 kilograms of calcium halophosphate phosphor is then thoroughly dispersed in the foregoing mixture to complete the homogeneous coating suspension.

This coating suspension or "paint" is now ready for application to a radiation transmissive substrate, and particularly a conventional tubular fluorescent lamp glass envelope. Techniques for applying such suspensions to fluorescent tubing are well known, and typically involve a flowing of the suspension via force of gravity down the interior surface of the tubing. The envelope may be precoated or pretreated with a wetting agent and the paint is generally gravity flowed to form a uniform coating. A stream of dry air at approximately 130° is directed through the interior of the envelope to assist in forming the uniform highly adherent coating.

The above coated fluorescent envelope is then heated at a temperature of about 650° C., whereby the polyacrylic acid binder is volatilized and carried from the envelope. The coated envelope is then ready for the next step in manufacturing a fluorescent lamp.

It must be pointed out that in practicing the present invention at least a substantial portion of the aluminum oxide must be first uniformly dispersed in the water vehicle prior to addition of the polyacrylic acid to prevent localized high concentrations of aluminum oxide during preparation which would result in flocculation of the aluminum oxide. Reference to the sole figure shows the conditions under which dispersion of the coating solution and the adherence promoting particles therein can be maintained. From the curve it can be seen that for a given weight percent of aluminum oxide particles a predetermined weight percent of polyacrylic acid can be added while maintaining a uniformly dispersed solution.

There are however other considerations which determined the preferred limitations within the requirements for maintaining dispersion, for additions of aluminum oxde and polyacrylic acid. The viscosity of the final coating suspension, in order to facilitate the coating process, should be from 50 to 150 centipoises. Since the polyacrylic acid content readily varies the viscosity, it has been found that the lower limit weight percent of polyacrylic acid addition based on weight of the water vehicle is about 0.1 weight percent. It has also been found that in order to facilitate the removal of the polyacrylic acid binder from the formed coating, the weight percent of polyacrylic acid should not exceed about 5 weight percent.

In order to promote adhesion of the coating as well as to not impair phosphor performance it is necessary to maintain the amount of aluminum oxide added at from 0.1 to 1.0 percent by weight of the phosphor added to complete the suspension. The preferred value is 0.2% aluminum oxide by weight of the halophosphate phosphor. Stating this another way, the weight ratio of luminescent material to aluminum oxide should be from 100/1 to 1000/1.

The calcium halophosphate phosphor is a conventional commercial phosphor activated by antimony or antimony plus manganese. The average particle size of such commercial phosphor ranges from 8 to 15 microns. The amount of phosphor included in the coating suspension can be readily varied to vary the amount of phosphor to be coated on the substrate. It has been found that approximately a final coating suspension which is 40 percent by weight phosphor is preferred.

It has been discovered that the amount of aluminum oxide added to the aqueous solution should be from 0.05 to 0.5 weight percent of the water vehicle before addition of the luminescent material.

The aluminum oxide as added in the specific example is a very finely divided material with an average particle size of from about 0.02 to 0.04 micron in diameter.

Various constituents were added to the aqueous solution in order to facilitate the formation of a very uniform phosphor layer. These materials are not required to provide a well dispersed coating suspension, but rather only affect the uniformity of the final coating. Thus the invention can be practiced without these additives, and their inclusion merely points out the preferred mode of practicing the invention.

The alkylphenoxy ethanol wetting agent is used to aid in wetting the glass and leveling the film of coating suspension as it flows on the substrate. The defoaming agent Nopco 1497V is used to eliminate the occurrence of clear spots on the finish coated substrate which can occur as a result of the formation of bubbles of foam which break after the coating about them has set. The triethanolamine and ammonium hydroxide are alkaline materials which are used to form the amine or ammonium salt of the polyacrylic acid. These salts are formed to provide a more viscous solution than is had from the use of just the acid. The pH of the solution is also controlled thereby so that the pH is preferably from 8 to 9.

The polyacrylic acid was added in the specific example as a solution containing about 25 percent by weight polyacrylic acid. The particular polyacrylic acid polymer added here has an average molecular weight of from 180,000 to 300,000. As polyacrylic acid of varying molecular weight is used the viscosity of the coating suspension would be adjusted.

While the invention has been described by way of specific examples, it is not to be limited thereto or thereby.

I claim as my invention:

1. A water vehicle coating suspension for applying a uniform luminescent coating onto fluorescent lamp envelopes comprising finely divided luminescent material, finely divided aluminum oxide, polyacrylic acid, and deionized water vehicle, wherein the relative proportions of said aluminum oxide and polyacrylic acid are such that a plot of weight percent of said aluminum oxide taken with respect to the weight of said water vehicle as expressed on a linear scale, against the weight ratio of said aluminum oxide to said polyacrylic acid, as expressed on a logarithmic scale, is to the left of the line A–B as shown in the figure.

2. The suspension as specified in claim 1, wherein said aluminum oxide has an average particle size of from about 0.02 to 0.04 micron in average diameter.

3. The suspension as specified in claim 1, wherein said luminescent material is calcium halophosphate phosphor with an average particle size of approximately 8 to 15 microns in average diameter.

4. The suspension as specified in claim 1, wherein said coating suspension has a viscosity of from 50 to 150 centipoises.

5. The suspension as specified in claim 1, wherein said aluminum oxide is preferably present in an amount of from 0.05 to 0.5 weight percent of said water vehicle.

6. The suspension as specified in claim 5, wherein said polyacrylic acid content is preferably from 0.1 to 5 weight percent of the water vehicle.

7. The suspension as specified in claim 5, wherein the weight ratio of luminescent material to said aluminum oxide is from 100/1 to 1000/1.

8. The suspension as specified in claim 7, wherein there is also included a small amount of wetting agent, a small amount of defoaming agent, and a small amount of ammonium hydroxide or amine sufficient to establish the pH of said suspension at from 8 to 9, and said polyacrylic acid has an average molecular weight of from 180,000 to 300,000.

9. The method of preparing a water vehicle coating suspension for applying a uniform luminescent coating onto fluorescent lamp envelopes, which method comprises admixing thoroughly predetermined amounts of finely divided aluminum oxide, deionized water vehicle, polyacrylic acid, and luminescent material to form said suspension, adding at least a substantial portion of said aluminum oxide to said suspension during mixing of same prior to adding said polyacrylic acid, thereafter adding said polyacrylic acid to said suspension in such amount that a plot of the weight percent of said aluminum oxide taken with respect to the weight of said water vehicle, as expressed on a linear scale, against the weight ratio of said aluminum oxide to said polyacrylic acid, as expressed on a logarithmic scale, falls to the left of the line A–B in the figure.

10. The method as specified in claim 9, wherein said aluminum oxide is added in an amount of from 0.05 to 0.5 weight percent of said water vehicle.

11. The method as specified in claim 10, wherein said polyacrylic acid added is from 0.1 to 5 weight percent of the water vehicle.

12. The method as specified in claim 10, wherein weight ratio of said luminescent material to said aluminum oxide is from 100/1 to 1000/1.

References Cited

UNITED STATES PATENTS

| | | | |
|---|---|---|---|
| 3,025,246 | 3/1962 | Reid | 252—455 |
| 3,316,109 | 4/1967 | Rimbach | 106—65 |

FOREIGN PATENTS 1,470,568  1/1967  France.

OTHER REFERENCES

Encyclopedia of Polymer Science and Technology, Interscience Publishers, New York, N.Y., vol. 1, pp. 222–3.

TOBIAS E. LEVOW, Primary Examiner

A. P. DEMERS, Assistant Examiner

U.S. Cl. X.R.

252—356